(No Model.)
W. M. MYERS.
BEE HIVE.
No. 338,285. Patented Mar. 23, 1886.
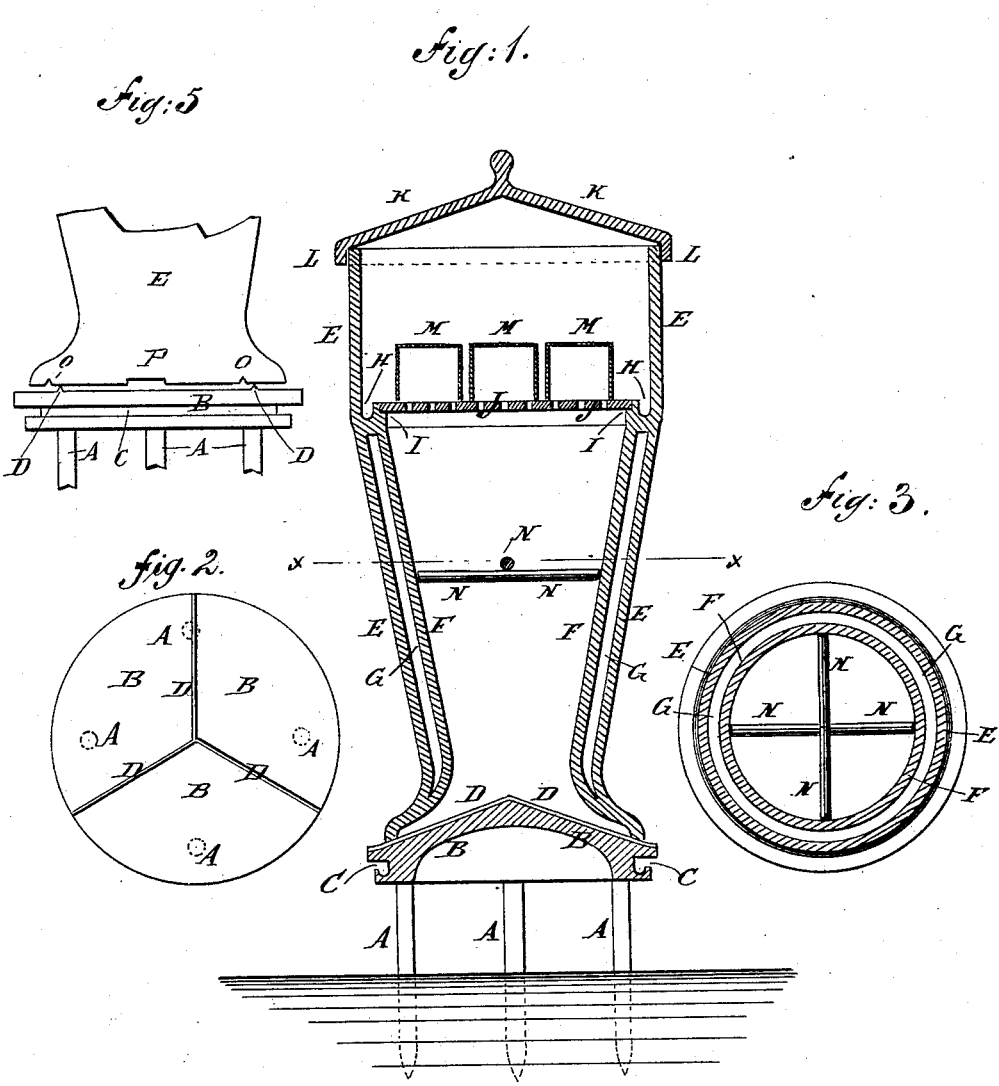

UNITED STATES PATENT OFFICE.

WILLIAM MAXWELL MYERS, OF HANNIBAL, MISSOURI.

BEE-HIVE.

SPECIFICATION forming part of Letters Patent No. 338,285, dated March 23, 1886.

Application filed May 18, 1885. Serial No. 165,935. (No model.)

*To all whom it may concern:*

Be it known that I, WILLIAM MAXWELL MYERS, of Hannibal, in the county of Marion and State of Missouri, have invented a new and useful Improvement in Bee-Hives, of which the following is a full, clear, and exact description.

Reference is to be had to the accompanying drawings, forming a part of this specification, in which similar letters of reference indicate corresponding parts in all the figures.

Figure 1 is a sectional side elevation of one of my improved bee-hives. Fig. 2 is a plan view of the base of the hive. Fig. 3 is a sectional plan view of the hive, taken through the line $x\,x$, Fig. 1. Fig. 4 is a plan view of a base of a hive made in rectangular form. Fig. 5 is a side elevation of a part of the hive.

The object of this invention is to provide bee-hives constructed in such a manner that the bees will be protected from moths and from changes in temperature.

The invention consists in the construction and combination of various parts of the hive, as will be hereinafter fully described, and then pointed out in the claims.

A represents three or more posts driven into the ground to support the hive.

B is the base of the hive, which is made conical in form, and is preferably concaved upon its lower side, leaving an annular rim to rest upon the upper ends of the posts A.

In the edge of the base B is formed an L-shaped groove, C, forming a channel to receive grease, to prevent moths from entering the hive from the ground.

Upon the conical upper surface of the base B are formed three or more radial ribs, D, for the lower edge of the hive-body to rest upon, so that the said lower edge will be supported above the surface of the said base, to allow bees to enter all around the hive and to allow the drippings from the bees to pass out of the hive.

The body of the hive is made with double walls E F, having an annular space, G, between them, which space G can be left as an air-chamber, or can be filled with some suitable non-heat-conducting material. The two walls E F can be permanently connected together or can be separable, as may be desired, and will protect the bees from the heat of summer and the cold of winter.

In the lower edge of the hive-body are formed as many recesses, O, as there are ribs D on the upper surface of the base B, and in such a position and of such a shape and size as to receive and fit upon the said ribs D when the hive-body is adjusted to bring the said recesses into line with the said ribs and allow the lower edge of the said hive-body to rest upon the said base.

In the lower edge of the hive-body are also formed one or more recesses, P, of sufficient size to serve as passage-ways for the bees when the said lower edge of the hive-body rests upon the base B. With this construction, in case of an attack by robber-bees, the hive can be adjusted to rest upon the base to keep out the robbers, the bees being able to guard the passages P against intruders. The inner wall, F, does not extend so high as the outer wall, E, and in the outer part of its upper edge is formed a channel, H, to receive grease, to prevent moths from entering the brood-chamber from the upper part of the hive.

In the inner side of the upper edge of the inner wall, F, is formed a rabbet, I, to receive the edge of the perforated honey-board J, the perforations of which are made of such a size as to allow the bees to pass through them readily.

Upon the upper edge of the outer wall, E, is placed a cap or cover, K, which is made with a downwardly-projecting flange, L, to keep it in place.

In the chamber above the honey-board J are placed the honey-boxes M, which I prefer to make in cubical form and with open bottoms, as indicated in Fig. 1.

If desired, comb-frames can be used in the upper chamber; but I prefer to use the honey-boxes as being more convenient for handling the honey.

In the middle part of the hive are placed cross-bars N, which cross each other at the center, and the ends of which rest against the inclined inner surface of the wall F, and which serve as supports for the bees to attach the combs to, so that the said bars and the combs can be removed from the hive together when desired.

The hive can be made round, as shown in the drawings, or square, as may be desired, and can be made of earthenware, wood, or metal; but I prefer to make it of earthenware, as having no cracks or crevices in which moths can lay their eggs.

Having thus fully described my invention, I claim as new and desire to secure by Letters Patent—

1. A bee-hive constructed substantially as herein shown and described, and consisting of the conical base B, having L-shaped groove C in its outer edge to receive grease, and radial ribs D on its upper surface, the double-walled body E F, having annular space G between the walls, and the cover K, substantially as herein shown and described.

2. In a bee-hive, the combination, with the conical base B, having L-shaped groove C in its outer edge and radial ribs D upon its upper surface, the double-walled body E F, having annular space G between the walls, and a groove, H, to receive grease in the rabbeted upper edge of the inner wall, and the cover K, of the perforated honey-board J, substantially as herein shown and described.

3. In a bee-hive, the base B, made, substantially as herein shown and described, with an L-shaped groove in its outer edge to receive grease to keep out moths, and radial ribs on its upper surface to support the hive-body and allow the bee-droppings to escape, as set forth.

WILLIAM MAXWELL MYERS.

Witnesses:
H. LOGAN,
J. LOGAN, Jr.